Jan. 12, 1971 B. BAKER ET AL 3,553,827

THERMOCOUPLES

Filed Jan. 9, 1968

INVENTORS,

BRIAN BAKER

ALAN ANTHONY BEYNON

RICHARD WILLIAM HUSSELBY

BY

Watson, Cole, Grindle + Watson

ATTORNEYS 3,553,827
THERMOCOUPLES

Brian Baker, Alan Anthony Beynon, and Richard William Husselby, Weston-Super-Mare, England, assignors to Bristol Aerojet Limited, Somerset, England Filed Jan. 9, 1968, Ser. No. 696,622
Claims priority, application Great Britain, Jan. 10, 1967, 1,361/67
Int. Cl. B01j 17/00; H01l 15/00
U.S. Cl. 29—573 8 Claims

ABSTRACT OF THE DISCLOSURE

Hot junctions for thermocouples for use at high temperatures are made by welding the two legs of the junction to an intermediate metal member and then melting the metal member.

This invention relates to the making of thermoelectric hot junctions and particularly, although not exclusively, such junctions for thermocouples.

A thermoelectric junction consists of two metal elements of different compositions joined to one another. When thermocouples are made for operation at comparatively low temperatures it is possible to select for the two elements of the hot junction materials which can easily and effectively be joined by, for example, welding. However, for operation at higher temperatures, such as temperatures of the order of 2,000° C., less tractable materials have to be used and it has been found extremely difficult to join the two elements of the hot junction and—even when means have been found to achieve such joining—it has been found that the parts of the elements close to the junction have been so embrittled by the joining operation as to make difficult further handling, both during subsequent steps in the manufacture of the thermocouple and later during handling, installation and use of the thermocouple.

According to the present invention, a method of making a thermoelectric hot junction comprises welding the two elements of the junction to an intermediate metal member of a material having a melting point lower than those of the materials of the two elements. In practice, of course, the melting point of the material of the intermediate member, while being below those of the materials of the legs, must be above the upper end of the range in which the junction is intended to operate.

The invention is particularly applicable to thermocouples employing materials having melting points above 1,600° C., for example metals such as tungsten and platinum and their alloys. One of the elements may be trungsten or a tungsten/rhenium alloy while the other may be a tungsten/rhenium alloy with more rhenium than the first element. Elements of this composition may be joined with an intermediate member of tantalum or niobium. Tungsten/rhenium alloys of various ranges may be employed but preferably one element has less than 20% rhenium and the other has between 20% and 50% rhenium, two preferred combinations being tungsten/5% rhenium with tungsten/26% rhenium and tungsten/13% rhenium with tungsten/26% rhenium. Other examples include platinum with platinum/10% rhodium and platinum with platinum/13% rhodium.

Preferably, after the elements are welded to the intermediate member the intermediate member is melted so as at least partly to embrace the legs. It is found that when the intermediate member is tantalum it forms itself into a bead when it is melted and thus surrounds the ends of the legs while niobium tends to wet the legs and thus spreads along the legs rather more than does tantalum.

Preferably, melting is achieved by the use of an electron beam or by the Tungsten Inert Gas method well known for welding as it is found that these methods of melting result in particularly low embrittlement of the legs of the thermocouple in the vicinity of the junction.

Although the method is particularly applicable to the production of hot junctions for thermocouples it may also be applicable to the preparation of hot junctions for thermoelectric generators.

The invention may be carried into practice in various ways but the hot junction of one particular thermocouple and its method of manufacture will now be described by way of example with reference to the accompanying drawing, in which.

Figure 1:
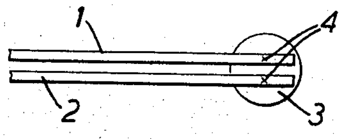
FIG. 1 shows the two elements of the thermocouple laid on the intermediate member.
Figure 2:
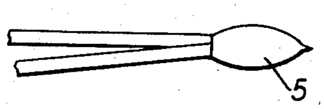
FIG. 2 shows the intermediate member after it has been melted.
Figure 3:
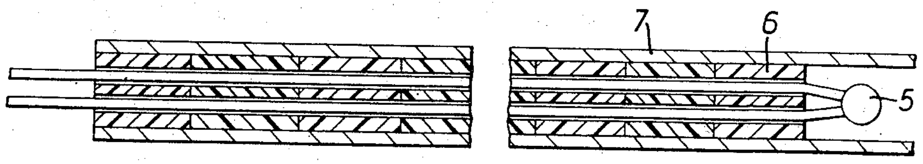
FIG. 3 shows the elements of the hot junction threaded into ceramic beads and the beads placed within a sheath.

The two elements of the hot junction are wires 1 and 2 which are of .125 mm. diameter and are of tungsten/5% rhenium and tungsten/26% rhenium alloys respectively. The wires are laid side by side with their ends on one face of an intermediate member formed by a disc-shaped tantalum shim 3 having a diameter of .8 mm. and a thickness of .15 mm. The wires are resistance welded at the points 4 indicated by crosses in FIG. 1 to the shim 3 using a "Watkins Orthodontic Spot Welder" made by Elliotts Liverpool Limited of Buckland St., Aigburth, Liverpool 17, England. The maximum dimensions of the intermediate member 3 perpendicular to the length of the wires 1 and 2 is then reduced by melting the member to form a small bead 5 (FIG. 2) at the thermojunction using an electron-beam welding machine with a chamber vacuum better than $10^{-4}$ millimetres of mercury, a voltage of 20 kv. and a beam current of 2 ma. The electron-beam welding machine comprises a Model 1615.0 Electron Gun Power Package and a 776W 30 kv. Electron Gun manufactured by Brad Thompson Industries Incorporated of Indio, Calif., United States of America. The beam is directed at the face of the shim other than that to which the wires are welded until melting of the shim is observed through a microscope. It has been found that with this method the wires in the vicinity of the bead have reasonable ductility and the junction is strong enough to survive the subsequent manufacturing operations and the various disturbances to be expected in handling, installation and service.

Figure 4:
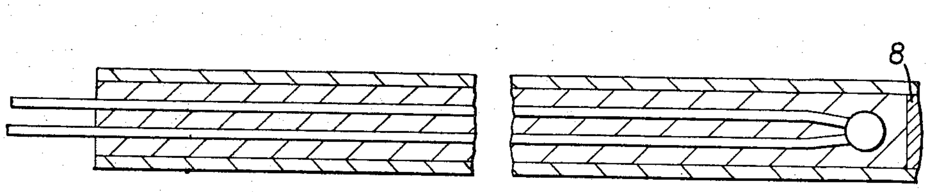
FIG. 4 shows the completed hot junction after the sheath has been swaged.

After the junction is made, the wires 1 and 2 are threaded through a row of ceramic beads 6 which have two holes through each to receive the two wires 1 and 2. Ductility in the vicinity of the bead is necessary to enable the wires to be threaded into the ceramic beads 6 and for the wires to be drawn through the ceramic beads to draw the tantalum bead 5 close to the end ceramic bead. The threaded assembly is then inserted into a tubular tantalum sheath 7 having both ends open. The assembly is moved into the sheath until the metal bead 5 is approximately 1.5 mm. within one end of the sheath 7. The cavity which surrounds the metal bead 5 and lies between the end ceramic bead 6 and the end of the sheath is then filled with powdered insulant of the same material as the ceramic beads and the sheath has an end cap 8 welded to it to seal one end. The sheath 7 with the threaded assembly inside is then swaged to compact the ceramic insulant to produce the finished hot junction shown in FIG. 4.

What we claim as our invention and desire to secure by Letters Patent is:

1. A method of making a thermoelectric hot junction which comprises providing two metallic elements having different constituencies and an intermediate metal member of a material having a melting point lower than those of said elements, welding the said elements to said intermediate member and, after said elements are welded to said intermediate member, melting said intermediate member whereby at least partly to embrace said elements.

2. A method as claimed in claim 1 in which the melting point of the material of said intermediate member is greater than 1,600° C.

3. A method as claimed in claim 1 in which each of said elements is selected from the group comprising tungsten and tungsten/rhenium alloys.

4. A method as claimed in claim 1 in which each of said elements is selected from the group comprising platinum and platinum/rhodium alloys.

5. A method as claimed in claim 1 in which said intermediate element is selected from the group comprising tantalum and niobium.

6. A method as claimed in claim 1 in which, after said intermediate member is melted, said elements are threaded through ceramic beads to form an assembly and said assembly is placed in a metal sheath.

7. A method of making a thermoelectric hot junction which comprises providing two wires having different constituencies and an intermediate metal member having a melting point lower than the melting points of the two wires but greater than 1,600° C., electric resistance welding said wires to said intermediate member, and melting said intermediate member with an electron beam whereby at least partly to embrace said elements.

8. A method of making a thermoelectric hot junction which comprises providing two wires having different constituencies and each being selected from the group comprising tungsten and tungsten/rhenium alloys, and an intermediate metal member of tantalum, welding the said wires to said intermediate member and melting said intermediate member whereby at least partly to embrace said wires.

References Cited

UNITED STATES PATENTS

| | | | |
|---|---|---|---|
| 1,229,770 | 6/1917 | Marsh. | |
| 3,343,589 | 9/1967 | Holzl | 29—573X |
| 3,362,064 | 1/1968 | Mellor et al. | 29—573 |
| 3,442,718 | 5/1969 | Dingwall et al. | 29—573X |

FOREIGN PATENTS

| | | | |
|---|---|---|---|
| 1,096,486 | 12/1967 | Great Britain | 29—573 |

JOHN F. CAMPBELL, Primary Examiner

W. TUPMAN, Assistant Examiner

U.S. Cl. X.R.

29—472.1, 497, 628; 136—211